United States Patent [19]

Joshi

[11] Patent Number: 4,688,169

[45] Date of Patent: Aug. 18, 1987

[54] COMPUTER SOFTWARE SECURITY SYSTEM

[76] Inventor: Bhagirath S. Joshi, 11 Sheffield Rd., Waltham, Mass. 02154

[21] Appl. No.: 739,162

[22] Filed: May 30, 1985

[51] Int. Cl.⁴ ............................................. G06F 7/02
[52] U.S. Cl. ................................................. 364/200
[58] Field of Search ... 364/200 MS File, 900 MS File, 364/300

[56] References Cited

U.S. PATENT DOCUMENTS

| | | | |
|---|---|---|---|
| 4,120,030 | 10/1978 | Johnstone | 364/200 |
| 4,139,893 | 2/1979 | Poland | 364/200 |
| 4,513,174 | 4/1985 | Herman | 364/200 |
| 4,573,119 | 2/1986 | Westheimer et al. | 364/200 |

*Primary Examiner*—Raulfe B. Zache
*Attorney, Agent, or Firm*—J. S. Iandiorio; Douglas E. Denninger

[57] ABSTRACT

A computer software security system for restricting execution of a computer program to a particular machine, including means for storing a machine identification code in the program and means for determining the presence of the machine identification code in the means for storing during execution of the program. A machine identification code unique to the machine is retrieved and compared with the machine identification code in the program. The system prevents further execution of the program unless both codes are present and match.

27 Claims, 10 Drawing Figures

Get Machine Ident. Code

Oper. Syst. Verification

COMPUTER SOFTWARE SECURITY SYSTEM

FIELD OF INVENTION

This invention relates to a computer software security system, and more particularly to a security system which prevents unauthorized execution of a program.

BACKGROUND OF INVENTION

Computer software may be divided into two types: operating systems and applications programs. An operating system controls the overall operation of a computer system. An operating system which originates from a storage source, such as a diskette, that is external to the computer is known as a disk operating system while an operating system located in read-only memory is known as firmware. Unless the entire operating system is located in firmware, the firmware of a computer system contains at least a "bootstrap loader" for loading the disk operating system. Applications software, typically originating from an external source, contains instructions for accomplishing a particular task and is executed through the operating system: the operation of the computer as instructed by the applications program is coordinated by the operating system.

External storage is easily transferred to other software-compatible machines and programs in the external storage is easily copied into other storage unless a suitable security system is provided. Unauthorized use or pirating of both types of computer software deprives the computer industry of millions of dollars annually.

There have been a number of attempts to curb software piracy. One of the earlier methods placed serial numbers in the software to allow tracing of unauthorized copies of the serialized software. This method requires the nearly impossible task of external enforcement to track down illegal copies. Further, these serial numbers can be located and erased.

One approach, the copy protection method, attempts to foil detection and erasure by scattering the application program in different sectors of the program storage disk. The entire disk must be copied to ensure that all portions of the program are copied; the serial number is hidden in the format to ensure that it is copied as well. The copy protection method makes deletion of the serial number more difficult, but does not overcome the problem of enforcement.

Another system uses a hardware key containing a code that matches the serial number for a particular software. The software cannot be run on a computer unless the matching key is inserted in a port of the computer. The problem with this approach is that both the key and the disk are transferrable to other machines.

Mechanisms for preventing copying, known as copy locks, attempt to prevent unauthorized progeny of a particular piece of software. However the copy locks can be circumvented and do not allow legitimate back-up copies to be made for archives.

Several protection methods limit the lifetime of program operation. One method employs a counter, located in software, which allows a predetermined number of startings of a host program before destroying the program. Once started, however, the program can be indefinitely maintained in an unaltered state.

In another method, a "parasite" is introduced after each stopping of a program: one byte in the program is changed in a predetermined manner after each stop. The parasite introduction commands are located in format which is normally not copyable. Also specified in format is a "parasite killer" which restores altered bytes to their original condition. As in the previous method, the protection system can be defeated by maintaining the program without further stopping and starting. Further, special programs are available to copy the entire disk including format containing the parasite killer. This replicated parasite killer can then be used to restore parasites in the replicated disk and in other unauthorized copies as well.

Some software vendors for mainframe computers place a calendar date in a clock in hardware. Software programs match their ending calendar date with that of the clock and do not function if the ending calendar date has expired. Vendors reprogram the clock after renewal fees are paid. This method is defeated by advancing the ending calendar date in the programs.

Copyright protection and licensing agreements between the manufacturer and the user afford legal protection but suffer from the problems of enforcement. To date, operating system software is rarely protected by other than these two methods.

SUMMARY OF INVENTION

It is therefore an object of this invention to provide an improved computer software security system which prevents a program from executing on computers other than an authorized machine.

It is a further object of this invention to provide such a security system which automatically prevents the program from executing.

It is a further object of this invention to provide such a security system which allows back-up copies to be made.

It is a further object of this invention to provide such a security system which remains operable when copied from a disk even when the entire disk is copied.

It is a further object of this invention to provide such a security system which permits an unlimited number of program startings on an authorized machine.

It is a further object of this invention to provide such a security system which affords convenient protection for applications software, operating system software, or both.

It is a further object of this invention to provide an improved computer software security system in which attempts to circumvent the system by tampering with hardware are detectable.

The invention features a computer software security system for restricting execution of a program to a particular machine. There are first storage means for storing a machine identification code unique to the machine, second storage means for storing a machine identification code in the program, and means for determining the presence of the machine identification code in the second storage means during execution of the program. There are also means for retrieving the unique machine identification code from the first storage means, means for comparing the unique machine identification code from said first storage means with the machine identification code in the second storage means, and means for preventing further execution of the program unless both codes are present and match.

In one embodiment, the first storage means is a memory circuit which may include a storage circuit printed on a circuit board in the machine, or may include a programmable read-only memory. Alternatively, the first storage means is located in operating system software designated for the machine and the program may be an applications program or all or part of the operating system software. The means for preventing execution may include an infinite loop or means for erasing the program completely or partially.

The system may further include means for inserting the machine identification code from the first storage means into the second storage means when the means for determining detects the absence of machine identification code in the second storage means. The means for inserting may be located in an operating system designated for the machine.

The invention also features a computer software security system including means for storing a machine identification code in the program, means for determining the presence of the machine identification code in the means for storing during execution of the program, means for retrieving a machine identification code unique to the machine, means for comparing the unique machine identification code with the machine identification code in the program, and means for preventing further execution of the program unless both codes are present and match. The system may further include means for inserting the machine identification code from the first storage means into the means for storing when the means for determining detects the absence of machine identification code in the means for storing. The program may be an operating system or an applications program.

The invention further features a method for restricting execution of a computer software program to a particular machine, including storing a machine identification code unique to the machine in a storage area, executing the program, and determining the presence of a machine identification code in the program during execution. The method further includes the steps of retrieving the unique machine identification code from the storage area, comparing the unique machine identification code from the storage area with the machine identification code when present in the program, and preventing further execution of the program unless both codes are present and match.

The step of preventing further execution may include placing the program in an infinite loop or erasing the program. The storage area may be located in a memory circuit or in operating system software designated for the machine. The method may further include the step of inserting the unique machine identification code from the storage area into the program when an absence of any machine identification code in the program is detected. The machine identification code may be obtained from the storage area for that code.

The invention also features a method including storing a machine identification code in a computer software program to be restricted, executing the program, retrieving the machine identification code, and retrieving, from a storage area, a machine identification code unique to the machine. The method further includes comparing the unique machine identification code from the storage area with the machine identification code in the program and preventing further execution of the program unless both codes are present and match.

DISCLOSURE OF PREFERRED EMBODIMENT

Other objects, features and advantages will occur from the following description of a preferred embodiment and the accompanying drawings, in which.

The invention may be accomplished by a computer software protection system which permits execution of a program only upon correct matching of a machine identification code in the program with a machine identification code unique to a particular machine. The unique machine identification code may be located in a hardware or firmware memory circuit such as a storage circuit printed on a circuit board in the machine, or such as a programmable read-only memory. Alternatively, the machine identification code may be located in operating system software designated for the machine.

The program to be protected may be all or part of an operating system or an applications program. Both the operating system and the applications program used on a particular machine may be protected according to this invention. The operating system typically obtains the unique machine identification code from one or more of the storage areas in the computer hardware or firmware. The applications program receives the machine identification code from or through the operating system. Alternatively, the code is provided externally, such as by a software vendor, once the program is purchased for an individual machine.

Figure 1:
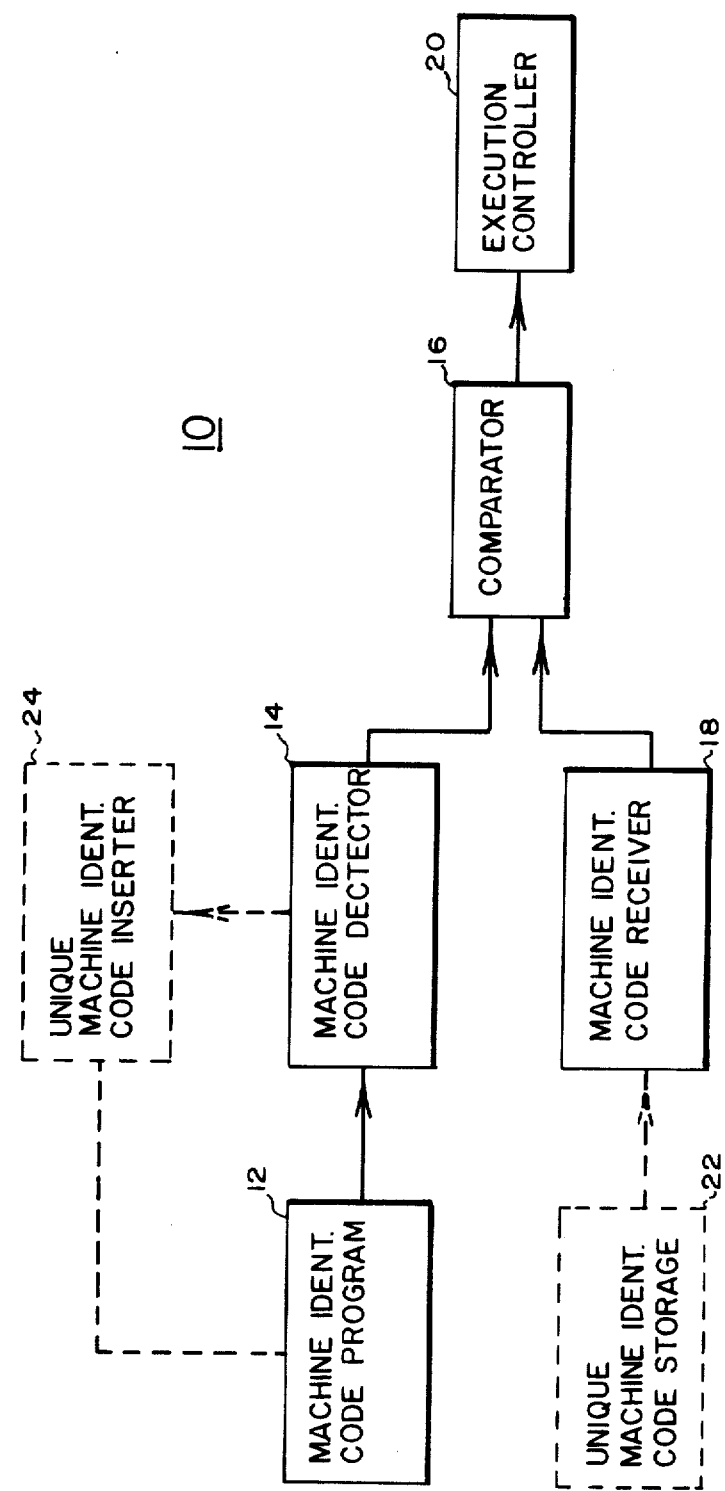
FIG. 1 is a schematic block diagram of a computer software security system according to this invention.

Computer software security system 10, FIG. 1, includes machine identification code program storage 12 and machine identification code detector 14. Code storage 12, located in the program to be protected, stores the unique machine identification code when the code is provided. Code detector 14 detects the presence of a machine identification code in storage 12 and, when the code is present, relays the code to comparator 16. Comparator 16 compares the code in the program, hereinafter referred to as the program code, with the machine identification code obtained by retriever 18. If the program code and the machine identification code are both present and match, execution controller 20 permits continued execution of the program. Detector 14, retriever 18, comparator 16 and controller 20 are typically located in the operating system.

Computer software protection system 10 may further include two additional components, shown in phantom. Machine identification code storage 22 stores the unique machine identification code for retrieval by retriever 18. Machine identification code inserter 24 responds to the absence of the program code in storage 12 as detected by detector 14. When the program code is absent from storage 12, inserter 24 inserts the unique machine identification code into storage 12 to serve as the program code.

Figure 2:
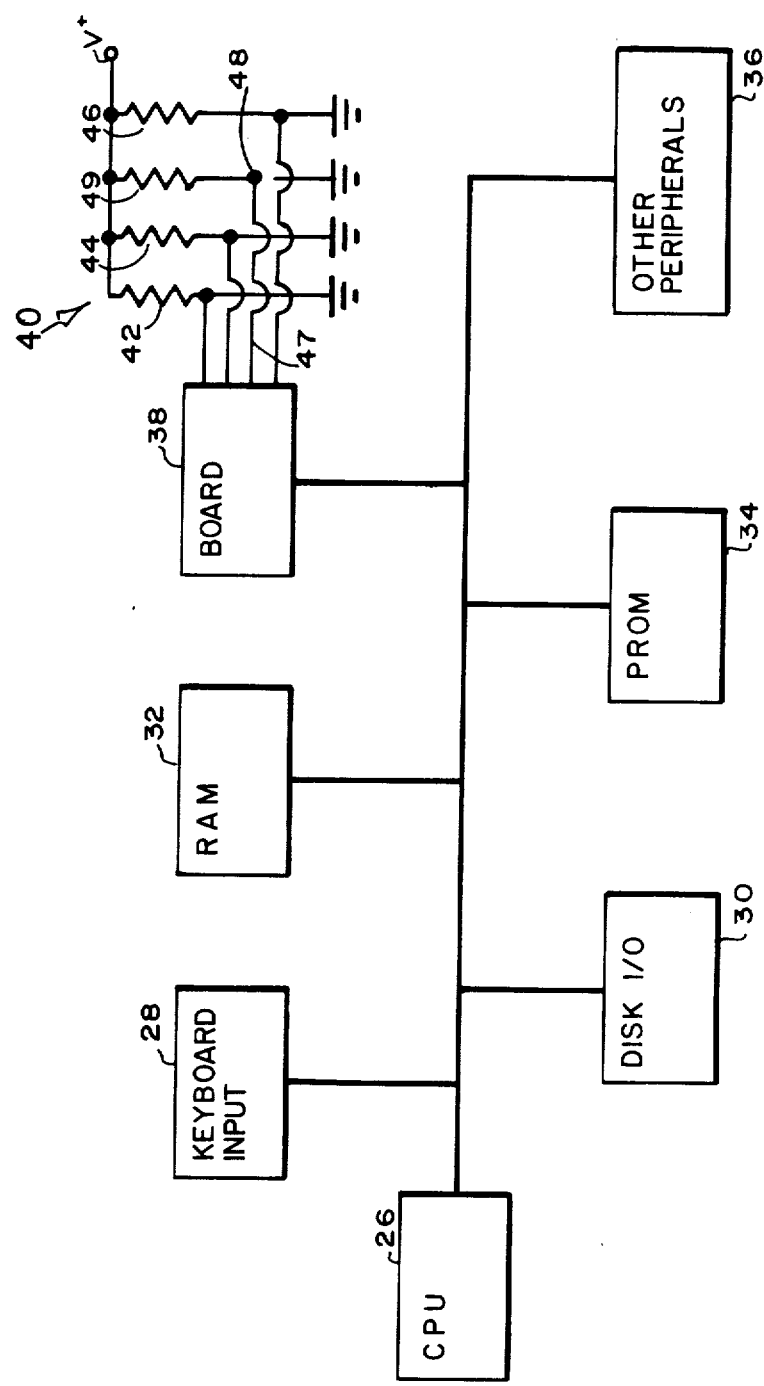
FIG. 2 is a schematic block diagram of a computer system incorporating a computer software security system according to this invention.

A block diagram of a typical computer system utilizing security system 10 is shown in FIG. 2. Central processing unit 26 is responsive to keyboard input 28, disk input/output 30, random access memory 32, programmable read-only memory circuit 34, and other peripherals 36 including serial I/O. In this embodiment CPU 26 is also responsive to circuit board 38 fo storing some or all of the machine identification code, as described below. A diskette containing the program to be protected is loaded through disk I/O 30 when loading commands are entered through keyboard input 28. The program is then partially or wholly loaded into RAM 32. When the program is an operating system, it waits in RAM 32 for instructions from keyboard input 28, disk I/O 30, or other peripherals 36. An applications program is loaded partially or wholly into RAM 32 and, as instructed by keyboard input 28, passes its instructions to the computer system. Programs protected according to this invention terminate execution unless the program code in the program matches the unique machine identification code.

The machine identification code is located in PROM 34 as illustrated below in FIG. 3. All or a portion of the machine identification code may also be located in board 38, FIG. 2, containing etched circuit 40. Circuit 40 serves as an additional memory port for the binary code 0010. The digital "zeros" are produced by resistors 42, 44 and 46 which are connected both to voltage source V+ and to ground. The digtial "one" is provided by etched path 48 which is separated from ground after point 48; approximately 3-5 volts is thereby provided through resistor 49 to board 38. Tampering with circuit 40 is readily visible to personnel during servicing of the machine.

Figure 3:
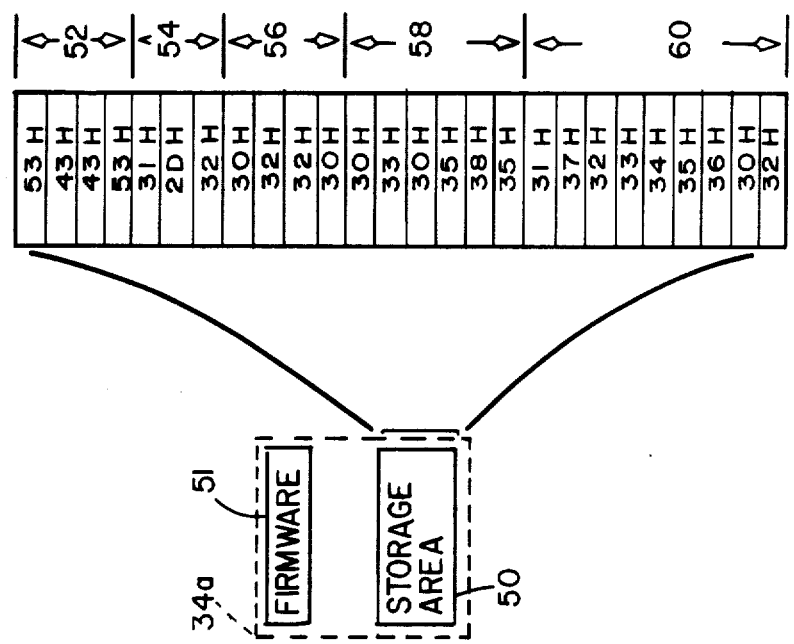
FIG. 3 is a partial detailed diagram of FIG. 2 showing a machine identification code located in a programmable read-only memory.

An example of a machine identification code is provided in storage area 50 of PROM 34a, FIG. 3. Storage area 50 contains blocks 52, 54, 56, 58 and 60, shown in expanded view. Block 52 designates the manufacturer of a machine in ASCII as SCCS. Block 54 indicates the revision as 1.2. Block 56 identifies the model number as 0220 while block 58 identifies the production date as 03/05/85. Block 60 designates the serial number as 172345602. While the machine identification code for this embodiment includes all of the above information, a smaller portion of the information could be used. Further, this information can be scrambled in storage area 50 or later encoded in different arrangements when copied into the operating system.

PROM 32a also contains firmware 51. Firmware 51 includes at least a bootstrap loader for loading and executing a disk operating system.

Figure 4:
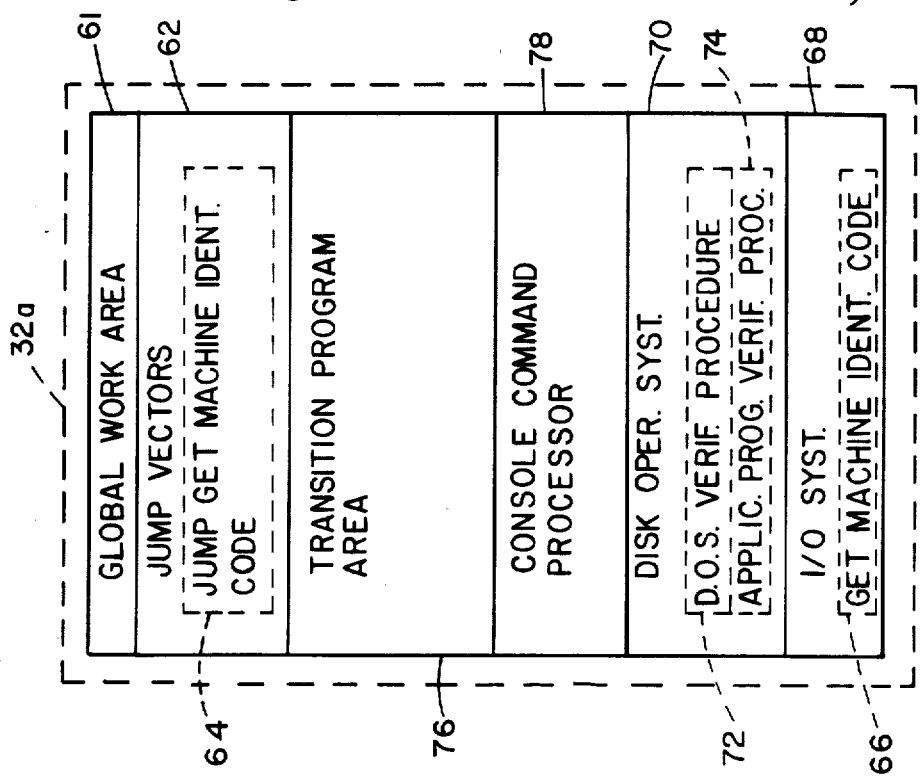
FIG. 4 is a detailed view of the random access memory of FIG. 2.

A portion of RAM 32a including portions of an operating system and an applications program is shown in FIG. 4. Global work area 61 is a memory area accessible by all programs. Jump vectors 62 contain pointer 64 which indicates the location of routine 66, Get Machine Identification Code. Routine 66 is located in basic or low-level I/O System 68. Jump vectors 62 and I/O System 68 are read from firmware or are part of the disk operating system.

Basic disk operating system 70 contains disk operating system verification procedure 72 for verifying the identity of the entire disk operating system and applications program verification procedure 74 for verifying the identity of the applications program. Depending on its size, all or part of the applications program is located in transition program area 76, having been loaded from its storage diskette. Console command processor 78, a separate portion of the operating system, conventionally identifies commands from keyboard input 28, FIG. 2, and acts upon these commands.

Figure 5:
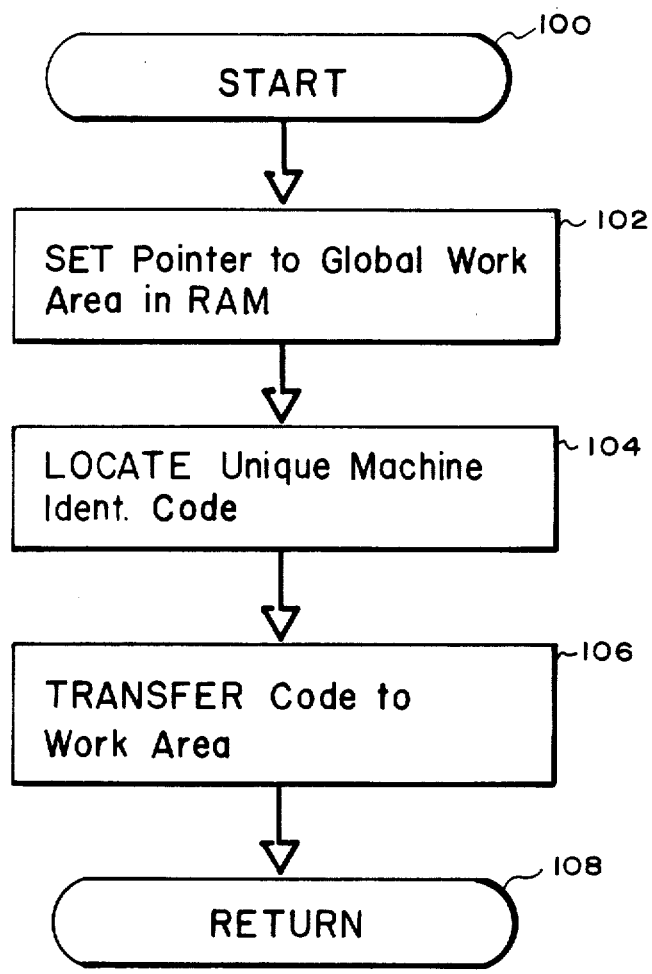
FIG. 5 is a flow chart of a procedure for obtaining the machine identification code.

The procedure for obtaining the machine identification code, Get Machine Identication Code, is shown in FIG. 5. When this procedure is called, step 100, a pointer is set to the global work area in RAM in step 102. In step 104, the unique machine identification code is located from its storage area, and in step 106, the code is transferred to the work area in RAM. After return, step 108, the machine identification code is utilized as described below. The procedure Get Machine Identification Code is located in PROM or in the basic I/O system of RAM.

Figure 6:
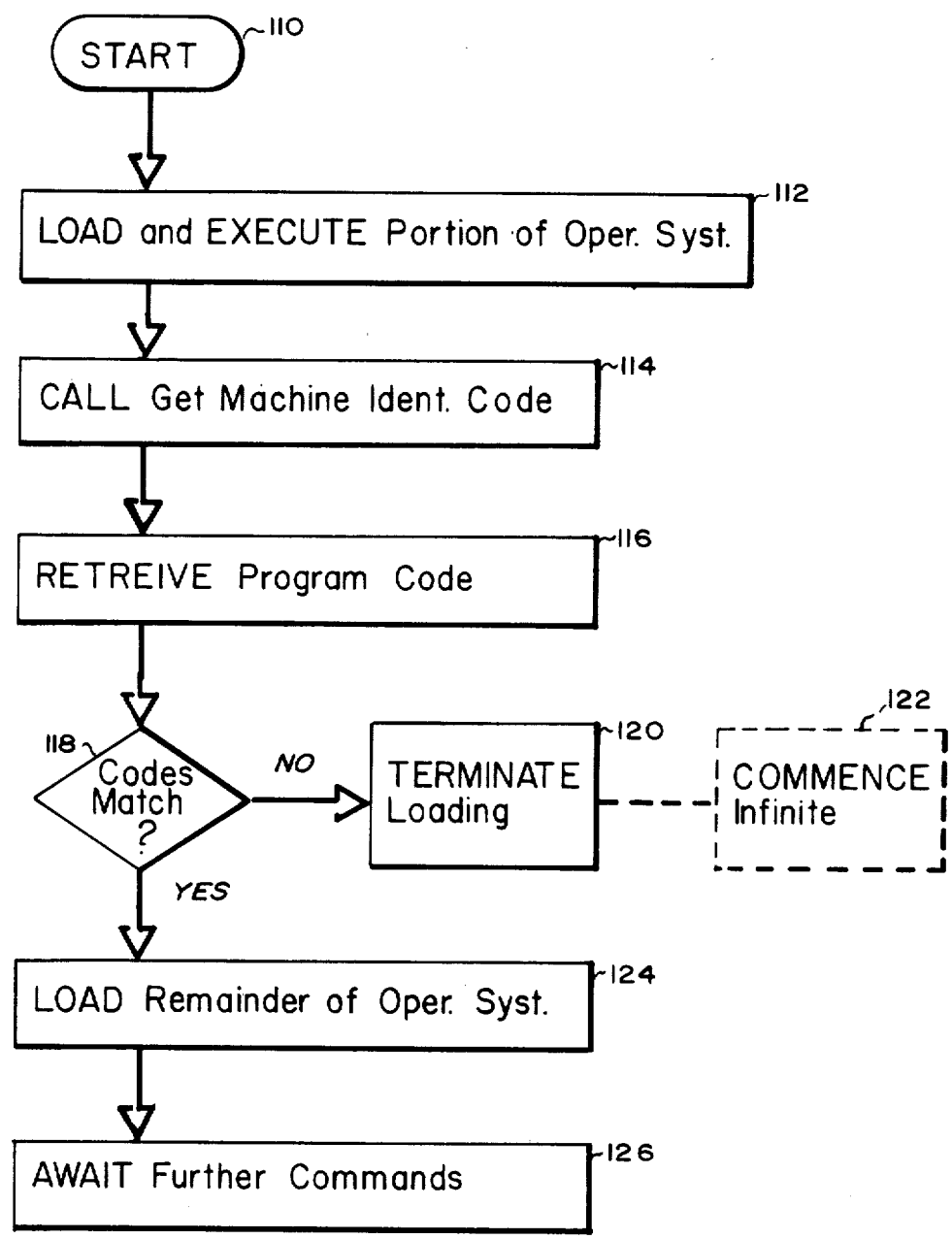
FIG. 6 is a flow chart of verification of an operating system protected according to this invention.

Operating system verification according to this invention begins at step 110, FIG. 6. A portion of the disk operating system is loaded and executed as step 112. Get Machine Identification Code, FIG. 5, is called in step 114. The verification procedure then retrieves the program code previously inserted in the operating system as retrieval step 116. The codes are compared in step 118 and if they do not match loading is terminated, step 120. Additionally, an infinite loop can be entered in step 122 to prevent further use of the unauthorized program. One example of an infinite loop are the commands

| WHILE [1] |
| { } |
| END WHILE | for programming language C. If the two codes match, the remainder of the operating system is loaded as step 124 at which point the operating system awaits further commands, step 126.

Figure 7:
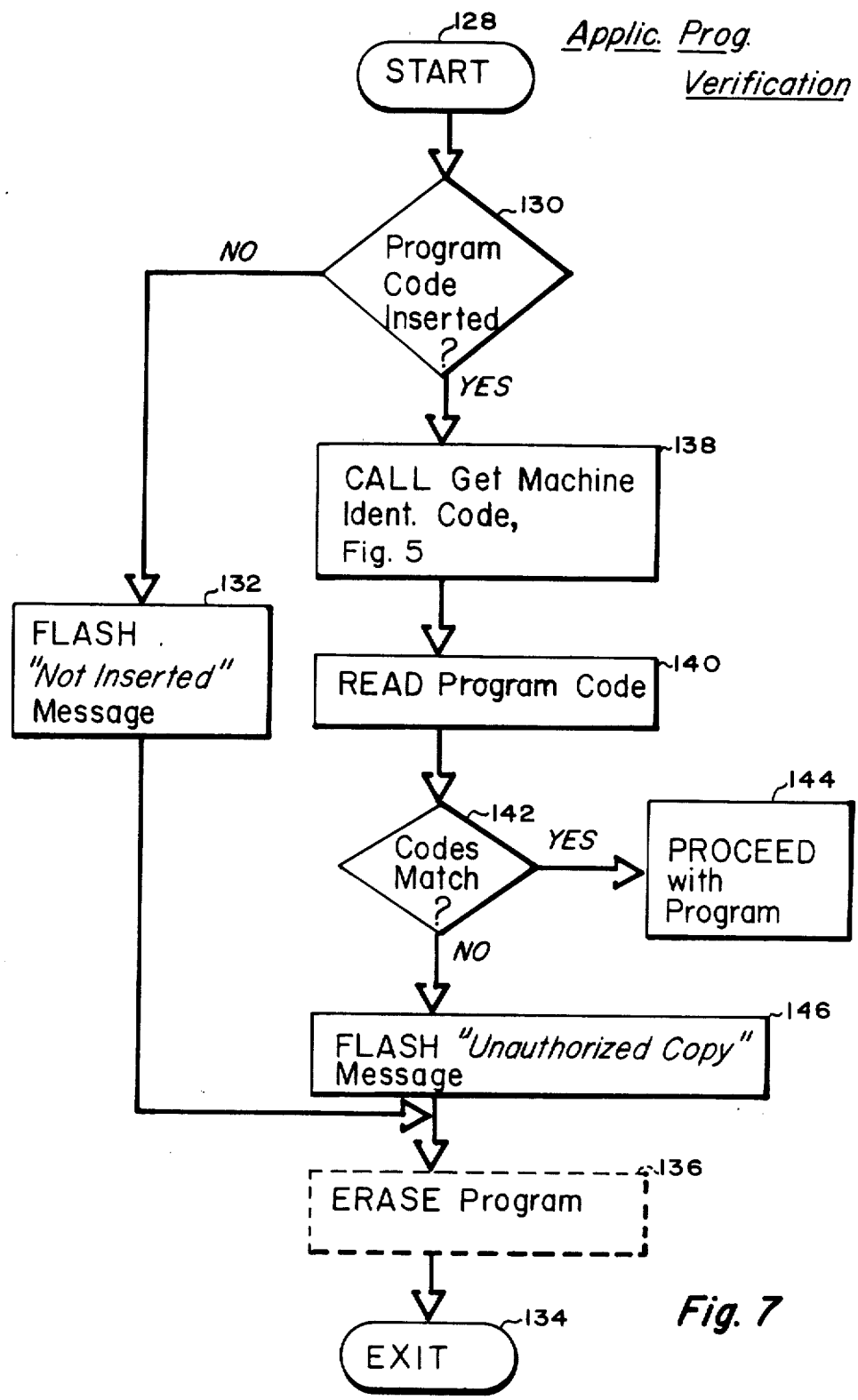
FIG. 7 is a flow chart of verification of an applications program protected according to this invention.
Figure 8:
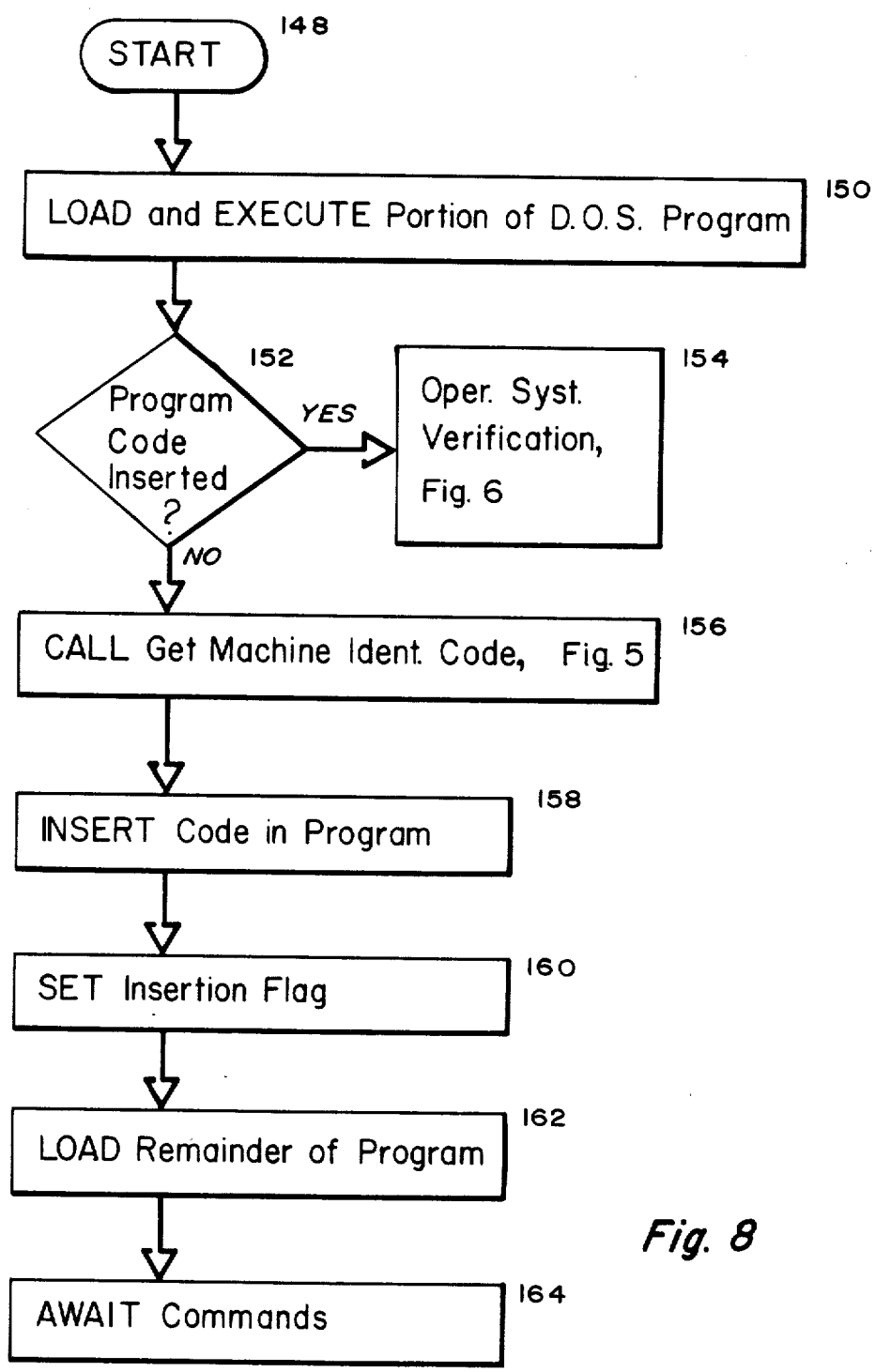
FIG. 8 is a flow chart of automatic insertion of a machine identification code according to this invention for a disk operating system.
Figure 9:
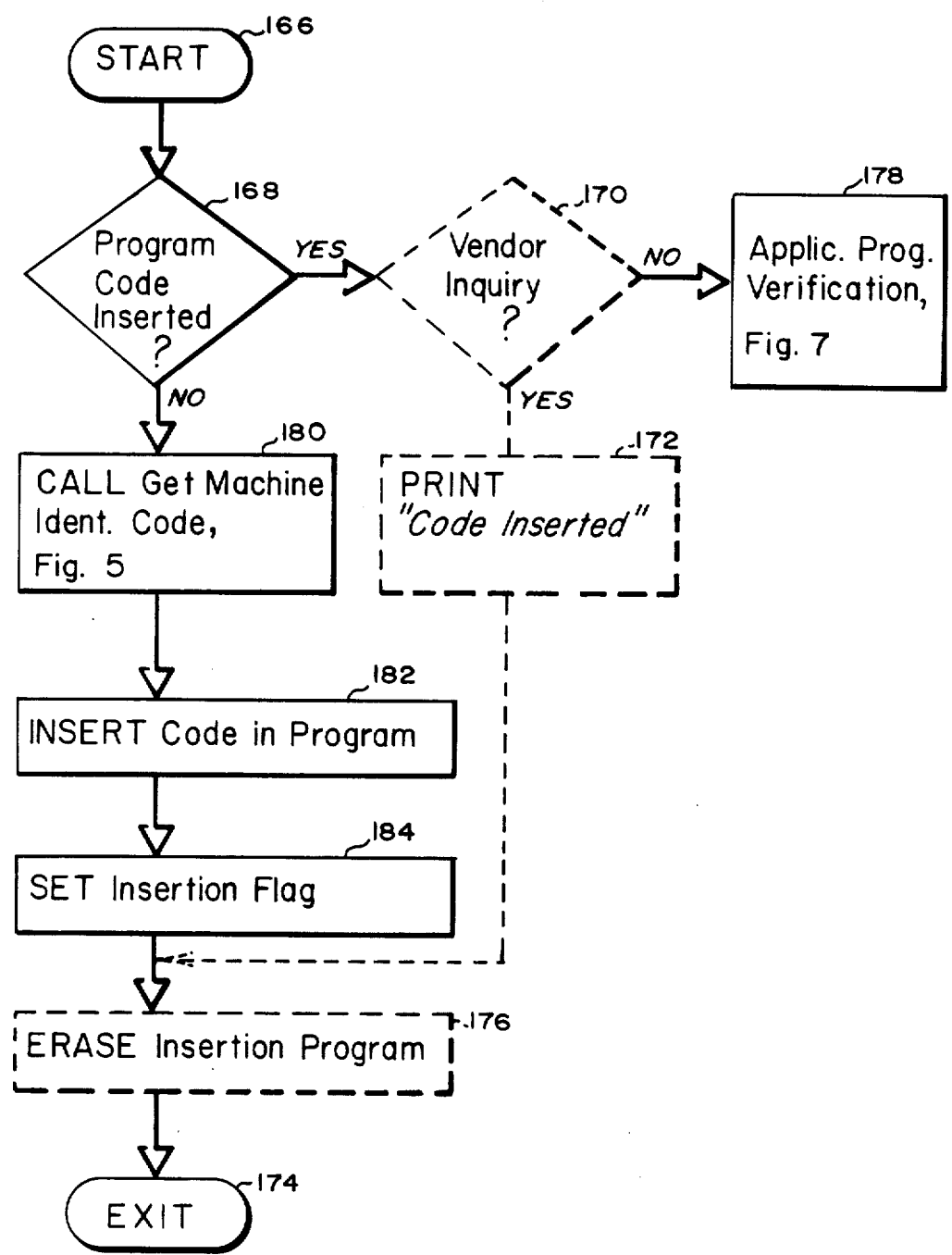
FIG. 9 is a flow chart of automatic machine identification code insertion for an applications program.

Applications programs are verified in a similar fashion. After application program verification is started, step 128, FIG. 7, the presence or absence of the program code is determined, step 130. The presence of the program code can be indicated with an insertion flag as described below in FIGS. 8 and 9. If the code is not inserted, a "not inserted" message is flashed on a display terminal in step 132. The verification procedure then exits, step 134. Optionally, the entire program is erased in step 136 when the application program is designed to be supplied with a program code already inserted.

When the program code is present, Get Machine Identification Code procedure, FIG. 5, is called in step 138. The program code is read, step 140, and compared to the machine identification code in step 142. If the codes match, the program proceeds with its instructions, step 144, while an "unauthorized copy" message is flashed in step 146 if the codes do not match. The verification procedure then exits, step 134, and may include program erasure, step 136.

To deter illicit erasure, it is desirable to locate the verification procedure in the body of the operating system program rather than in a subroutine. Also, the verification procedure may be conducted several times during the course of program operation to provide additional security.

Typically, the program code for a disk operating system is inserted automatically: the disk operating system itself contains the procedure for code insertion. Automatic Code Insertion procedure, FIG. 8, proceeds from starting step 148 to step 150 in which a portion of a disk operating system program is loaded into the computer by a bootstrap loader and executed. If any code is determined to be present in the program code storage area at step 152, step 154 begins Operating System Verification, FIG. 6. If a program code has not been inserted, Get Machine Identification Code, FIG. 5, is called in step 156. The machine identification code is inserted into the program as the program code, step 158, out of which an insertion flag is set, step 160. One example of an insertion flag in programming language C before and after setting is:

Insertion flag=false;
Insertion flag=true;

where a byte in the code area designated as Insertion flag is changed from value "0" to value "1". The remainder of the operating system program is loaded, step 162, after which the operating system awaits further commands, step 164.

The program code for the applications program may be inserted automatically or manually. Automatic Application Program Insertion begins at step 166, FIG. 9. At step 168, the presence or absence of any code in the program code storage area is determined. The insertion procedure, located in the operating system of a computer, is initiated when the user executes the applications program. Alternatively, a software vendor can install the program code once the machine identification code is known. If a program code has been inserted and a vendor is making the inquiry, step 170, "code inserted" is printed, step 172. The insertion procedure is exited, step 174. Optionally, the insertion program may be erased, step 176.

Alternatively, the applications program is shipped to the user with the automatic application program insertion procedure provided, in which case the vendor protects the applications program using conventional copy protection until the user first executes the program. Upon execution, the program code is inserted in the program by the automatic insertion procedure. When the user is operating the applications program, the insertion procedure, after determining that the program code is inserted, proceeds to step 178 which begins Application Program Verification, FIG. 7. If the program code has not been inserted, Get Machine Identification Code, FIG. 5, is called at step 180. The machine identification code is then inserted as a program code, step 182, after which an insertion flag is set, step 184. The insertion procedure exits, step 174, may include erasure step 176 to prevent later tampering with the program code. During vendor inquiry, steps 180, 182, 184, 176 are replaced with a step which flashes the message: "program code not inserted".

Figure 10:
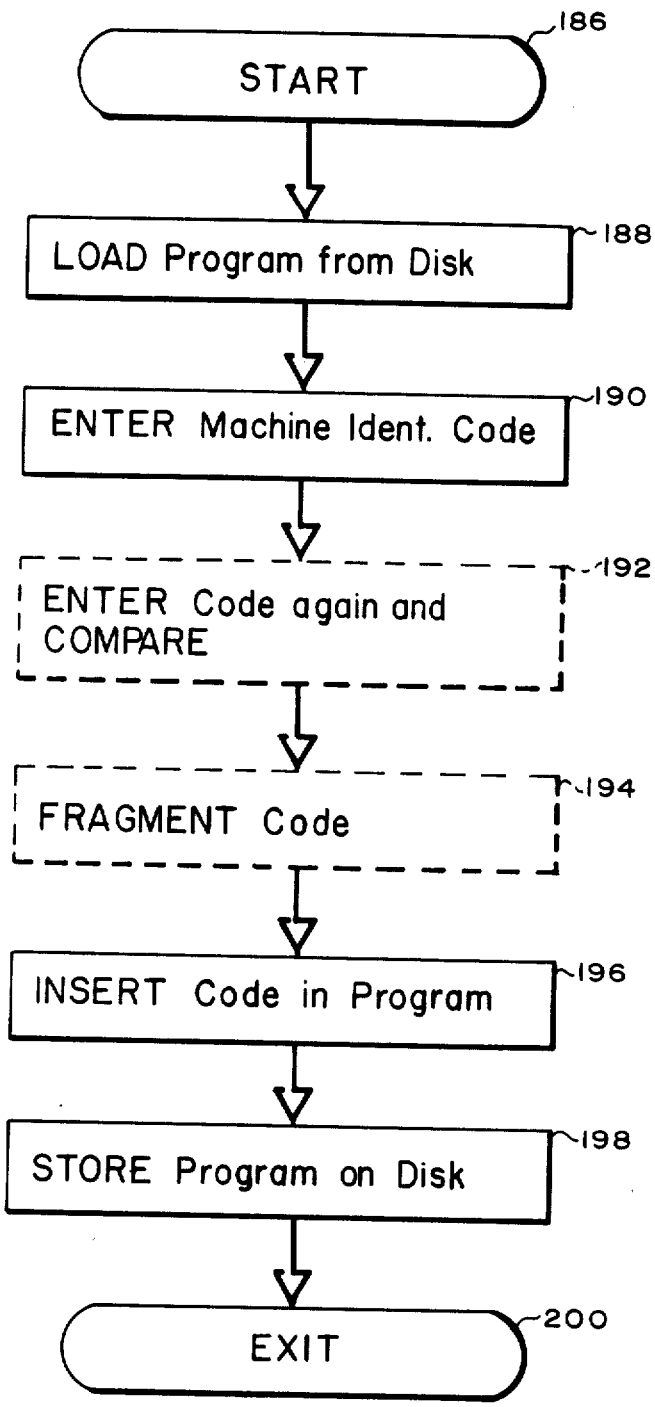
FIG. 10 is a flow chart of manual insertion of a machine identification code into an applications program.

A software vendor may instead prefer the Manual Application Program Insertion procedure, FIG. 10, wherein the program code is inserted manually before the applications program is delivered to the user. After beginning this procedure, step 186, the program is loaded from the disk, step 188, onto a computer of the vendor. After receiving relevant information identifying the particular machine, the vendor enters the machine identification code, step 190. Accuracy is assured by optional step 192 where the code is entered a second time and compared with the first entry. To deter later erasure, the code is fragmented, phantom step 194. The machine identification code is inserted in the program, step 196, and the program is returned to the disk, storage step 198, exit step 200.

Although specific features of the invention are shown in some drawings and not others, this is for convenience only as each feature may be combined with any or all of the other features in accordance with the invention.

Other embodiments will occur to those skilled in the art and are within the following claims.

What is claimed is:

1. A computer software security system for restricting execution of a program to a particular machine comprising:

first storage means for storing a machine identification code unique to said machine;

second storage means for storing a machine identification code in said program;

means, responsive to said second storage means, for determining the presence of said machine identification code in said second storage means during execution of said program;

means, responsive to said first storage means, for retrieving said unique machine identification code from said first storage means;

means, responsive to said means for determining and said means for retrieving, for comparing said unique machine identification code from said first storage means with said machine identification code in said second storage means; and means, responsive to said means for comparing, for preventing further execution of said program unless both said machine identification codes are present and match.

2. The software security system of claim 1 in which said first storage means is a memory circuit.

3. The software system of claim 2 in which said memory circuit includes a storage circuit printed on a circuit board in said machine.

4. The software system of claim 2 in which said memory circuit includes programmable read-only memory.

5. The software system of claim 1 in which said first storage means is located in operating system software designated for said machine.

6. The software system of claim 5 in which said program is an applications program.

7. The software system of claim 5 in which said program is a portion of the operating system software.

8. The software system of claim 1 in which said means for preventing execution includes an infinite loop.

9. The software system of claim 1 in which said means for preventing execution includes means for erasing said program.

10. The software system of claim 9 in which said means for erasing is capable of completely erasing said program.

11. The software system of claim 1 in which said program is an operating system.

12. The software system of claim 1 in which said program is an applications program.

13. The software system of claim 1 further including means, responsive to said means for determining, for inserting said unique machine identification code from said first storage means into said second storage means when said means for determining detects the absence of machine identification code in said second storage means.

14. The software system of claim 13 in which said means for inserting is located in an operating system designated for said machine.

15. A computer software security system for restricting execution of a program to a particular machine comprising:
- first storage means for storing a machine identification code unique to said machine;
- second storage means for storing a machine identification code in said program;
- means, responsive to said second storage means, for determining the presence of said machine identification code in said second storage means during execution of said program;
- means, responsive to said means for determining, for inserting said unique machine identification code from said first storage means into said second storage means when said means for determining detects the absence of code in said second storage means;
- means, responsive to said first storage means, for retrieving said unique machine identification code from said first storage means;
- means, responsive to said means for determining and said means for retrieving, for comparing said unique machine identification code from said first storage means with said machine identification code in said second storage means; and
- means, responsive to said means for comparing, for preventing further execution to said program unless both said machine identification codes are present and match.

16. A computer software security system for restricting execution of a program to a particular machine comprising:
- means for storing a machine identification code to said program;
- means, responsive to said means for storing, for determining the presence of said machine identification code in said means for storing during execution of said program;
- means for retrieving a machine identification code unique to said machine from a storage area;
- means, responsive to said means for determining and said means for retrieving, for comparing said unique machine identification code from the storage area with said machine identification code in said program; and
- means, responsive to said means for comparing, for preventing further execution of said program unless both said machine identification codes are present and match.

17. The software system of claim 16 further including means, responsive to said means for determining, for inserting said unique machine identification code into said means for storing when said means for determining detects the absence of machine identification code in said means for storing.

18. The software system of claim 16 in which said program is an operating system.

19. The software system of claim 16 in which said program is an applications program.

20. A method for restricting execution of a computer software program to a particular machine comprising:
- storing a machine identification code unique to the machine in a storage area;
- executing the program;
- determining the presence of a machine identification code in the program during execution;
- retrieving the unique machine identification code from the storage area;
- comparing the unique machine identification code from the storage area with the machine identification code when present in the program; and
- preventing further execution of said program unless both codes are present and match.

21. The method of claim 20 in which the storage area is a memory circuit.

22. The method of claim 20 in which the storage area is located in operating system software designated for the machine.

23. The method of claim 20 in which the step of preventing further execution includes placing the program in an infinite loop.

24. The method of claim 20 in which the step of preventing further execution includes erasing the program.

25. The method of claim 20 further including the step of inserting the unique machine identification code from the storage area into the program when an absence of machine identification code in the program is detected.

26. The method of claim 20 in which the unique machine identification code is obtained from the storage area.

27. A method for restricting a computer software program to a particular machine comprising:
- storing a machine identification code in the program;
- executing the program;
- retrieving the machine identification code;
- retrieving, from a storage area, a machine identification code unique to the machine;
- comparing the unique machine identification code from the storage area with the machine identification code in the program; and
- preventing further execution of the program unless both codes are present and match.

* * * * *